Nov. 5, 1963
E. R. PRICE
3,110,031
REACTION MEANS FOR SERVOMOTORS
Original Filed Nov. 27, 1957
3 Sheets-Sheet 1
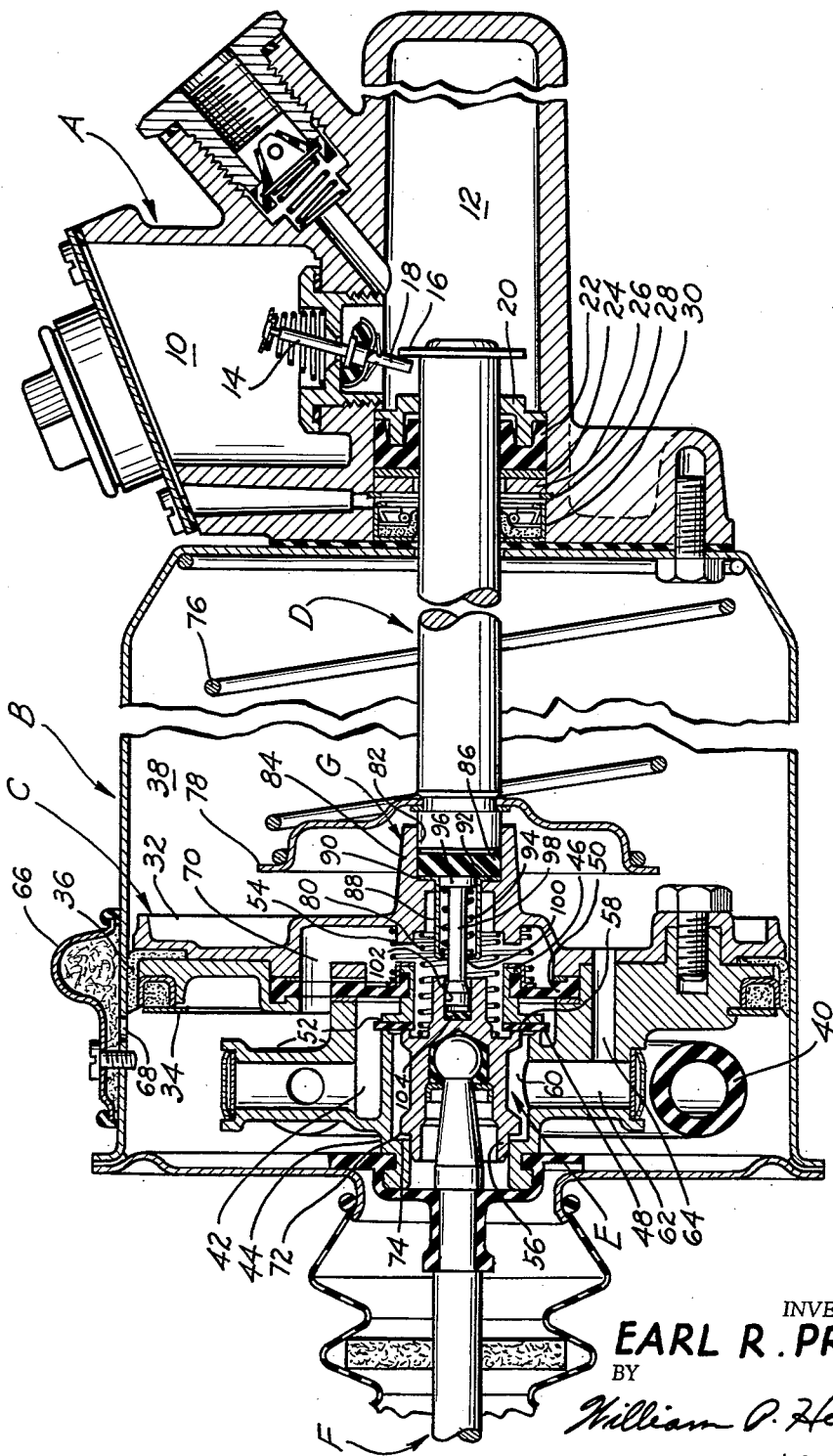
INVENTOR.
EARL R. PRICE.
BY
William P. Hickey
ATTORNEY.

Nov. 5, 1963
E. R. PRICE
3,110,031
REACTION MEANS FOR SERVOMOTORS
Original Filed Nov. 27, 1957
3 Sheets-Sheet 2
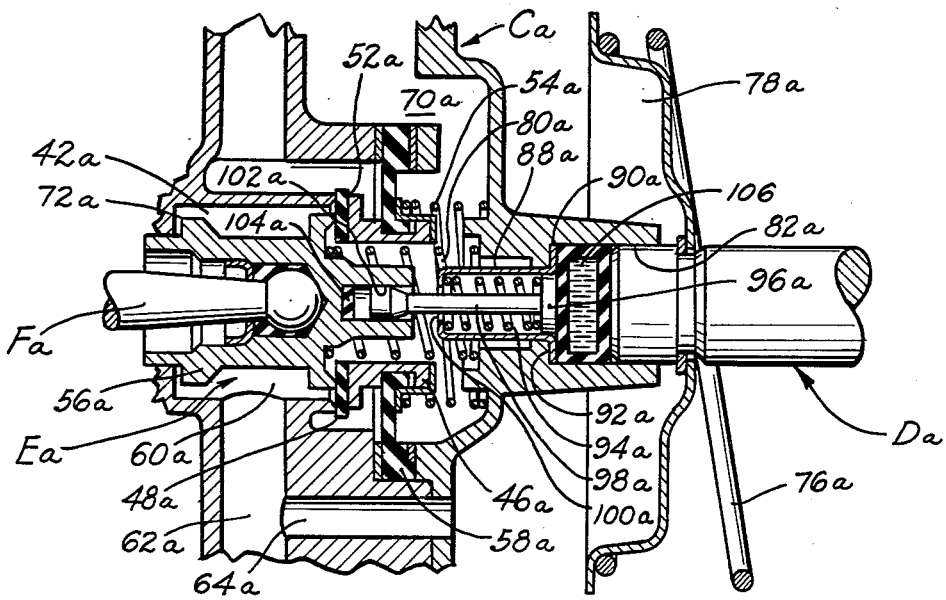
FIG_2
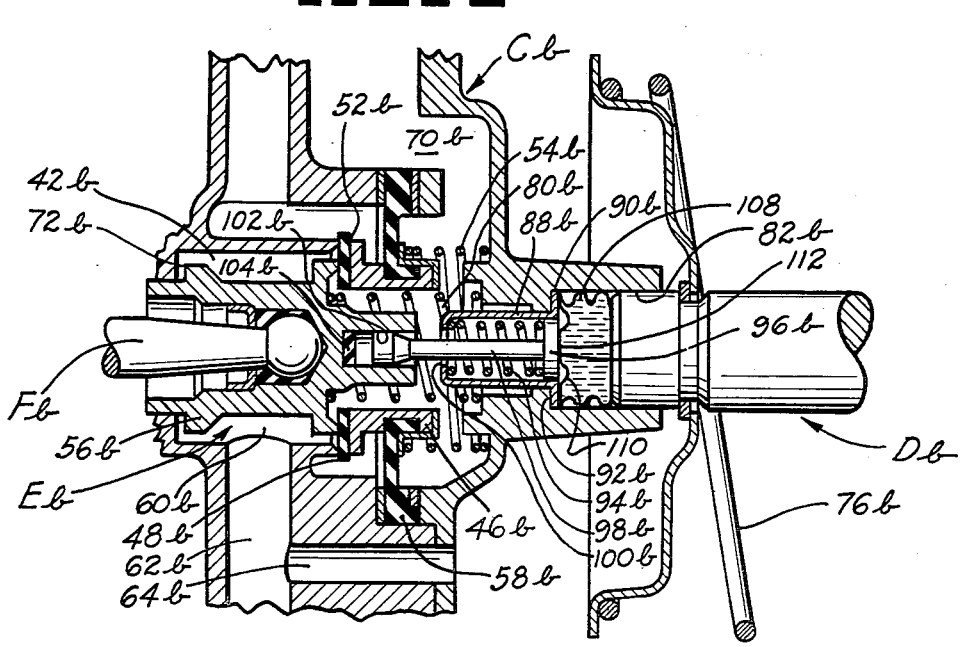
FIG_3
INVENTOR.
EARL R. PRICE.
BY
*William P. Hickey*
ATTORNEY Nov. 5, 1963 E. R. PRICE 3,110,031
REACTION MEANS FOR SERVOMOTORS
Original Filed Nov. 27, 1957 3 Sheets-Sheet 3
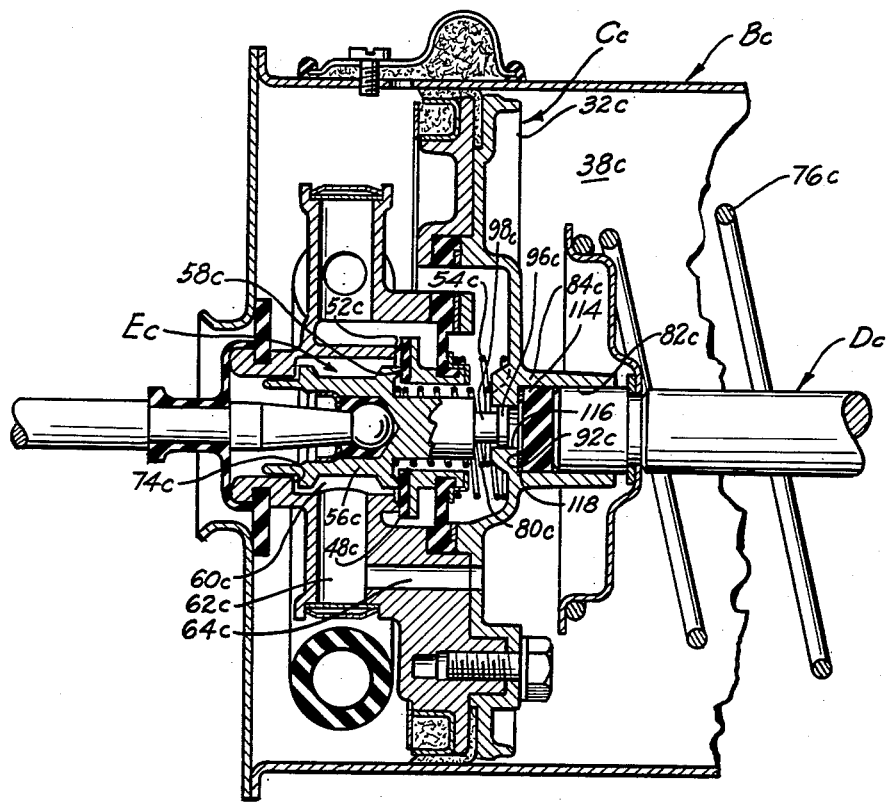
FIG_4
INVENTOR.
EARL R. PRICE.
BY
William P. Hickey
ATTORNEY.

United States Patent Office
3,110,031
Patented Nov. 5, 1963

3,110,031
REACTION MEANS FOR SERVOMOTORS
Earl R. Price, South Bend, Ind., assignor to The Bendix Corporation, a corporation of Delaware
Continuation of application Ser. No. 699,384, Nov. 27, 1957. This application Aug. 21, 1959, Ser. No. 835,371
33 Claims. (Cl. 60—54.5)

The present invention relates to reaction producing devices, and more particularly to a new and improved servomotor construction wherein the output force of the servomotor is used to pressurize a semi-rigid body against which the reaction transferring means abuts to provide a reaction whose intensity is generally proportional to the size of the abutting reaction member and the intensity of the force being delivered by the servomotor.

The present application is a continuation application of my copending application Serial No. 699,384, filed November 27, 1957, and now abandoned.

An object of the present invention is the provision of a new and improved reaction producing servomotor which employs a minimum of parts that are inexpensively manufactured and readily assembled, which will be reliable and efficient in its operation, and which is for all intents and purposes failure-proof.

A further object of the invention is the provision of a new and improved reaction providing servomotor having a collapsible chamber operatively positioned between its power actuated and driven elements so as to be collapsed by a force generally proportional to the delivered force of the servomotor unit, and in which chamber is positioned a semi-rigid body of pressurizable material adapted to produce a pressure against a reaction member which in turn opposes actuating movement of the control element of the servomotor.

The invention resides in certain constructions and combinations and arrangements of parts, and further objects and advantages will become apparent to those skilled in the art to which the invention relates from the following description of the preferred embodiments described with reference to the accompanying drawings forming a part of the specification, and in which:

FIGURE 1 is a cross sectional view of a fluid pressure servomotor actuated master cylinder of the type used to actuate the braking systems of automotive vehicles, and in which principles of the present invention are embodied;

FIGURE 2 is a fragmentary cross sectional view of a portion of a servomotor similar to that shown in FIGURE 1 but incorporating a second embodiment of portions of the invention;

FIGURE 3 is a fragmentary cross sectional view similar to that of FIGURE 2 but showing a third embodiment of portions of the invention; and, FIGURE 4 is a fragmentary cross sectional view similar to that of FIGURES 2 and 3 but showing still another embodiment of portions of the invention.

The fluid pressure servomotor driven master cylinder shown in FIGURE 1 generally comprises a hydraulic master cylinder A which is bolted to the front or closed end of a fluid pressure servomotor B having a power piston C therein which is adapted to drive or force a fluid displacement member D into the hydraulic master cylinder A to displace fluid therefrom. Actuation of the fluid pressure servomotor B is controlled by a control valve structure E which is carried by the power piston C and which in turn is controlled by a pushrod F that extends through the cover plate on the rear end of the servomotor B, and which in turn is adapted to be moved by the brake pedal lever of an automotive vehicle.

The master cylinder A corresponds generally to the construction of that shown in the Edward E. Hupp Patent No. 2,864,632 and so will not be described in detail here. Suffice it to say that the master cylinder A includes a reservoir 10 which is communicated with its fluid pressurizing chamber 12, into which the fluid displacement member D projects, through a check or tilt valve structure 14 which will close off flow from the chamber 12 to the reservoir 10 when the fluid displacement member D is actuated, and which will be tilted or opened by an abutment washer 16 of the fluid displacement member D when the fluid displacement member is retracted to cause the abutment washer 16 to engage the stem 18 of the tilt valve structure. In the retracted position of the fluid displacement member D, the pressure in the pressurizing chamber 12 will be generally atmospheric pressure and any expansion or contraction of the fluid that has taken place will be compensated for by the addition of fluid from the reservoir 10 into the pressurizing chamber 12.

The rear end of the pressure chamber 12 is closed off by annular sealing means positioned between the fluid displacement member D and the sidewalls of the pressurizing chamber 12 and which includes a retainer 20, lip seal 22, nonmetallic backup washer 24, metallic backup washer 26, snap ring 28, and vacuum seal 30.

The power piston C is formed by means of front and rear piston sections 32 and 34, respectively, which are bolted together to retain a seal 36 on its outer periphery and to provide an internal valve chamber within the power piston. The fluid pressure servomotor shown in the drawing is an atmospheric submerged one in which atmospheric pressure is provided on both sides of the power piston C during its normal deactuated condition, and is actuated by the communication of vacuum to the power chamber 38 on the front side of the power piston C. Vacuum for the actuation of the servomotor is obtained usually from the manifold of the vehicle in which it is mounted, and is conducted through a short section of flexible hosing 40 to a forwardly opening annular vacuum chamber 42 which is formed in a boss 44 projecting rearwardly from the back side of the power piston C. The front end of the annular vacuum chamber 42 is normally closed off by means of an annular valve poppet member 46 which has a small relatively stiff seating flange 48 on its rearwardly positioned end, and which has a larger flexible flange or diaphragm portion 50 on its forwardly positioned end. The radially outer edges of the diaphragm 50 are clamped between the piston sections 32 and 34 to effect a seal therewith, and the rear seating flange 48 is normally biased into engagement with an annular vacuum valve seat 52 formed on the radially inner partition wall of the annular vacuum chamber 42 by a coil spring 54 positioned between the front piston section 32 and the annular poppet member 46. Vacuum from the flexible connection 40 is normally confined within the vacuum chamber 42 by means of the radial extending diaphragm 50 and the abutment of the rear or seating flange 48 against the vacuum valve seat 52.

Control of the servomotor is had by the actuation of a movable control member 56 which is axially positioned inwardly of the vacuum valve chamber 42 and which is adapted to alternatively communicate either atmospheric pressure or vacuum to the front power chamber 28 during its actuation. The forwardly positioned end of the control member 56 is provided with an annular atmospheric valve seat 58 which is adapted to abut the seating flange 48 of the valve poppet member 46 just inwardly from the vacuum valve seat 52. The annular space 60 between the atmospheric and vacuum valve seats 58 and 52 respectively provides a control chamber 60 which communicates with the front power chamber 38 through passages 62 and 64 cast within the power piston C. Atmospheric pressure is continually supplied to the rear side of the power piston C through air filter 66, an opening 68 in the sidewall of the servomotor, and thence through the cast atmospheric passageway 70 in the power piston C to the space forwardly of the diaphragm 50 and which in turn communicates with the atmospheric valve seat 58. In the normal condition of the servomotor, the movable control member 56 is positioned rearwardly out of engagement with the seating flange 48, such that its annular stop 72 abuts shoulder 74 in the rear end of the valve cavity. In this position air from the rear side of the power piston C is permitted to flow through the passage 70, control chamber 60, passages 62 and 64 to the front power chamber 38.

Actuation of the servomotor structure so far described is initiated by the depressing of the brake pedal lever of the vehicle (not shown), whereupon the control member 56 is moved axially inwardly to cause the atmospheric valve seat 58 to abut the seating flange 48 of the annular poppet member 46. Communication of atmospheric pressure from the rear side of the power piston C to the power chamber 38 is thereby broken off; and further inward movement of the control member 56 causes the annular poppet member 46 to be moved inwardly out of engagement with the vacuum valve seat 52 to thereafter communicate the valve's vacuum chamber 42 to the power chamber 38 through the control chamber 60 and the above described passageways. A decrease in pressure is then developed in the power chamber 38 causing the power piston C to be moved forwardly and the fluid displacement member D to be forced into the pressurizing chamber 12 of the hydraulic master cylinder A thereby initiating a brake application of the vehicle. When the desired intensity of the brake application is reached, further forward movement of the pushrod F is stopped, whereupon the power piston C continues to move forwardly just sufficiently to move the vacuum valve seat 52 into engagement with the seating flange 48 of the poppet member 46, and thereby prevents a further reduction in pressure within the power chamber 38.

If the operator desires to reduce the braking effort, the pushrod F is retracted or permitted to move rearwardly, whereupon the atmospheric valve seat 58 of the control member 56 moves rearwardly out of engagement with the seating flange 48 of the poppet member to thereafter communicate atmospheric pressure from the rear face of the power piston C to the power chamber 38 to thereby decrease the pressure differential across the power piston. The hydraulic pressure within the master cylinder chamber 12 in conjunction with a return spring 76 positioned between the front end of the servomotor and a spring abutment plate 78 suitably affixed to the displacement member D causes the displacement member D and the power piston C to be moved rearwardly to follow up the retractile movement of the control member 56. When the desired reduction in intensity of brake application is reached and further movement of the control member 56 is stopped, a slight additional rearward movement of the power piston C will again bring the seating flange 48 of the valve poppet member 46 into engagement with the atmospheric valve seat 58 to thereafter prevent further pressure rise in the power chamber 38. A valve return spring 80 is provided for biasing the control member 56 rearwardly out of engagement with the poppet member 46; and if a complete release of the brakes is desired, removal of the operator's foot from the brake pedal lever will permit the control member 56 to be held in engagement with the shoulder 74 to cause full atmospheric pressure to be communicated with the power chamber 38 thereby atmospherically suspending the unit causing the power piston C to assume its retracted position shown in the drawing.

The servomotor B shown in FIGURE 1 is of the type which supplies a reaction force to its control member to apprise the operator of the amount of force being developed or delivered by the servomotor unit. According to certain of the principles of the present invention, the output force of the servomotor unit is applied to one face of a confined pressurizable body against which the reaction member of the servomotor unit abuts, and which body can be picked up and handled by an assembler during assembly. The reaction producing structure G shown in FIGURE 1 employs a collapsible chamber 82 operatively positioned between the power actuated element or power piston C and the driven element or fluid displacement member D. In the present instance the collapsible chamber is formed by a forwardly opening cylindrical chamber that is cast into an axially extending boss 84 on the front piston section 32. The rearwardly positioned end of the fluid displacement member D is slidably positioned in the forward end of the chamber 82, and a pressure deformable body 86, later to be described, is positioned between the end of the fluid displacement member D and the rearward end of the chamber 82. Upon actuation of the servomotor unit, the power piston C will be forced forwardly causing the boss 84 to telescopically slide over the end of the fluid displacement member D as fluid pressure is built up in the pressurizing chamber 12 of the master cylinder A. The force delivered up to the fluid displacement member D therefore causes a deformation pressure in the semi-rigid pressure deformable body 86 which will be of an intensity generally proportional to that being delivered by the fluid displacement member D to the liquid in the hydraulic chamber 12. As previously indicated, the deformation pressure developed within the pressure deformable body 86 is exerted against reaction structure which will exert its force against the control member of the servomotor unit to oppose its actuating movement. The reaction transmitting structure shown in FIGURE 1 comprises a cup-shaped member 88 having a radially outwardly turned flange 90 adjacent its open end and which is positioned between the pressure deformable body 86 and the shoulder 92 in the rearward end of the chamber 82. A coil spring 94 is positioned between the rear end of the cup-shaped member 88 and the head 96 of a reaction pin 98 to hold the head 96 into engagement with the pressure deformable body 86; and the other end of the reaction pin 98 extends through an opening 100 in the rear end of the cup-shaped member 88 into proximity with the movable control member 56. The projecting end of the reaction pin 98 extends into a bore 102 in the forward end of the control member 56 for sliding engagement with the sidewalls thereof. The reaction pin 98 will preferably be of such a length as to provide a predetermined clearance between the rearwardly positioned end of the reaction pin and a rubber abutment washer 104 in the bottom of the bore 102 when the atmospheric valve seat 58 of the control member is in abutment with the seating flange 48 of the valve poppet member 46. The counter-reaction coil spring 94 is of such a strength as to oppose deformation of the pressure deformable body 86 into the cup-shaped member 88 until such time as a pressure of approximately 100 p.s.i. is produced in the hydraulic chamber 12. When pressures above approximately 100 p.s.i. are produced in the hydraulic chamber 12, counter-reaction spring 94 yields to permit the reaction pin 98 to be forced rearwardly into the cup-shaped member 88 and the rearwardly positioned end of the reaction pin to come into engagement with the control member 56. Any further increase in hydraulic pressure within the chamber 12 will thereafter produce an increased deformation pressure within the pressure deformable body 86 which can no longer be equalled by the force exerted by the counter-reaction spring 94, and the unequalled force will be delivered to the control member 56 to apprise the operator of the magnitude of the pressure rise in the hydraulic chamber 12 above the generally predetermined amount of approximately 100 p.s.i. The predetermined amount of hydraulic pressure which in the present instance is approximately 100 p.s.i. is intended to simulate that pressure at which the vehicle's brake shoes engage their brake drums to thereby start the deceleration of the vehicle.

It has been found that numerous types of semi-rigid or deformable bodies can be used to obtain a deformation pressure indicative of the amount of compressive force being applied to the body. The embodiment shown in FIGURE 1 employs a solid piece of an elastomeric compound which will preferably have a normal cross section slightly larger than the chamber in which it is fitted so as to provide a snug fit within the chamber and thereby prevent the body from falling out of position during the assembly operation. Numerous formulations of natural and synthetic rubbers have been tested and all have been found capable of being extruded into and out of the opening in which the reaction member is positioned over many hundreds of thousands of cycles without failure. The amount of force required to extrude the materials used into and out of the reaction plunger opening increases generally with the hardness of the material, as measured by a durometer, etc., and substantially all of the materials display a phenomenon commonly called hysteresis wherein a slightly greater force is required to extrude the material into the reaction opening during an actuation of the servomotor than is required during the release of the servomotor unit when the material is moving back out of the reaction chamber. The hysteresis tests were made by measuring the amount of force required to be applied to the pushrod F of a servomotor unit similar to that shown in the drawing as the hydraulic pressure in the master cylinder A is caused to first increase from and then decrease to atmospheric pressure. Natural gum rubbers have been found to produce hysteresis values which are entirely acceptable, while some of the synthetic rubbers may be excessive, particularly where the hardness of the rubber exceeds approximately 30 durometers. The hysteresis loss, as it is called, was entirely acceptable in all instances where the disk was coated with a suitable lubricant as, for example, an oil, grease or molybdenum disulfide, and it has been found that entirely acceptable hysteresis values are obtained when the elastomer contains minute quantities of oil uniformly distributed throughout the elastomeric mass, such as is obtained by the homogeneous mixing of oil into the elastomeric mass prior to its vulcanization. Elastomers into which oil is so incorporated are commonly referred to as oil filled stock, and a Buna N type oil filled stock has been found to produce entirely acceptable results without the coating of an additional lubricant. Tests made on a fluorinated silicone polymer have shown the material to have extremely low hysteresis losses without the use of a lubricant coating.

The embodiment shown in FIGURE 2 corresponds generally to that shown in FIGURE 1, differing principally in that a slightly different type of deformable is used to provide the desired reaction. Those parts of FIGURE 2 which are similar to corresponding parts in FIGURE 1 are designated by a like reference numeral characterized further in that a suffix "a" is affixed thereto. The pressure deformable body 106 shown in FIGURE 2 comprises a flexible bag filled with a suitable hydraulic liquid, as for example a rubber bag filled with a vegetable oil, and operates in a manner similar to that described for the embodiment shown in FIGURE 1.

The embodiment shown in FIGURE 3 correspond generally to that shown in FIGURE 2 and differs principally in that the reaction transmitting pressure deformable body shown therein is a bellows arrangement having a metallic casing that is completely filled with a hydraulic liquid. Those parts of FIGURE 3 which are similar to corresponding parts in FIGURE 1 are designated by a like reference numeral characterized further in that a "b" is suffixed thereto. The bellows 108 preferably is provided with a corrugation 110 positioned adjacent the reaction plunger opening to facilitate movement of the button 112, that is formed within the annular corrugation, into and out of the reaction plunger opening. The bellows will preferably also contain one or more corrugations on its outer periphery to facilitate collapse of the unit by the fluid displacement $D_b$.

The embodiment of the servomotor shown in FIGURE 4 is quite similar to that shown in FIGURE 1, and in several respects represents a simplification in structure over that shown in FIGURE 1. In the embodiment shown in FIGURE 4, those parts which are similar to corresponding parts shown in FIGURE 1 will be designated by a like reference numeral and will be characterized further in that a "c" is suffixed thereto. The chamber 82c of the present embodiment is likewise formed in the annular boss 84c cast integrally with the front piston section 32c. As in the embodiment shown in FIGURE 1, a cylindrical disk or body of an elastomeric compound is positioned in the bottom of the chamber 82c and the end of the fluid displacement member $D_c$ is permitted to abut the outer face of the elastomeric body. It has been found that elastomeric bodies of sufficient stiffness, as measured by a durometer or the like, have sufficient resiliency that their own resistance to deformation can be used to provide counter-reaction in place of the counter-reaction spring 94 used in the previous embodiments. The reaction 98c in the present embodiment is formed integrally on the forward end of valve control member 56c and extends into a guide bore 116 that is formed directly in the front piston section 32c. This construction has the further advantage over that shown in FIGURE 1 in that it eliminates alignment problems of an intermediate pin, which pin if out of alignment produces a troublesome cocking action. The guide bore 116, of course, communicates with the chamber 82c, and the end of the reaction pin 98c, as in the previous embodiments, is provided with a head 96c which slidingly engages the sidewalls of the bore 116 and is adapted to abut the rear side of the elastomeric body 114. In the present embodiment, however, the pin 98c is provided with length as to provide a predetermined clearance between its head 98c and the elastomeric body 114 when the atmospheric valve seat 58c is in its lapped position with respect to the vacuum valve seat 52c and the seating flange 48c. By adjusting this clearance with respect to the stiffness of the elastomeric body 114, a desired predetermined force will be required to be delivered by the force output member, or in this case the fluid displacement member $D_c$, in order to cause the body 114 to be extruded into the guide bore 116 sufficiently to engage the head 96c. Entirely satisfactory results can be achieved by use of this expediency in place of the spring 94 of the previous embodiments without loss in other desirable characteristics such as service life, hysteresis loss, "feel," etc.

The amount of force required to be exerted upon the body 114 in order to cause it to engage the head 96c of the reaction pin 98c increases generally with increased clearance provided between these members. Manufacturing processes such as are used to produce this type of servomotor on a mass production basis produce parts having sufficient differences in axial dimensions as to excessively change the amount of manual effort which must be applied to the pushrod F to produce a predetermined hydraulic pressure within the chamber 12. It has been found that the clearance between the head 96c and the body 114 can vary as much as .030 inch when produced by these processes, and that a change in clearance of approximately .010 inch using a Buna N type elastomeric body 114 having a durometer reading of 35 will produce changes in the hydraulic pressure in chamber 12 in amounts of 20 to 25 p.s.i. Twenty to 25 p.s.i. is considered to be the maximum allowable variation in output pressure between different units coming off of the assembly line; and accordingly an annular washer or shim 118 may be positioned between the body 114 and the shoulder 92c formed in the bottom of the chamber 82c. The thickness required of this shim may be determined by moving the control member 56c into its lap position, while at the same time inserting a micrometer gauge into the chamber 82c, before the body 114 has been installed, to measure the distance between the head of the pin 96c and the shoulder 92c. The necessary thickness of the shim 118 can thereafter be readily determined and the proper thickness of shim may be put in place prior to the time that a disk 114 is pressed into place.

The operation of the embodiment shown in FIGURE 4 will be similar to that of the previous embodiments. In the released condition of the braking system, valve member 56c will be in abutment with the shoulder 74c to provide clearance between the atmospheric valve seat 58c and the seating flange 48c permitting atmospheric pressure from the rear side of the power piston C to flow into the control chamber 60c and thence to the power chamber 38c to establish the normal atmospheric suspended condition of the servomotor. Depressing of the brake pedal lever of the vehicle causes the atmospheric valve seat 58c to abut the seating flange 48c and thereby prevent further atmospheric communication to the power chamber 38c; and continued inward movement causes the flange 48c to move out of engagement with the vacuum valve seat 52c to communicate vacuum with the control chamber 60c and the power chamber 38c. Reduction of pressure in the chamber 38c causes the power piston C to move forwardly to gradually increase the hydraulic pressure within the pressurizing chamber 12. Sufficient clearance is provided between the head 96c of the reaction pin 98c and the body 114 to permit the valve structure to be stroked without causing the head 96c to abut the body 114, until such time as a predetermined force is applied to the fluid displacement member D. The valve seats 52c and 58c are of quite large diameter, such that very little travel is necessary with respect to the flange 48c in order to permit the necessary passage of air flow actuation of the servomotor. This travel will normally only be a few thousandths of an inch during normal actuations of the servomotor. As more and more force is applied by the power piston C to the fluid displacement member D through the elastomeric body 114, the deformation pressure within the body increases causing the body to gradually extrude into the guide bore 116. The amount of extrusion is generally proportional to the deformation pressure applied to the body 114; and at some predetermined level of output force applied to the fluid displacement member D, contact between the body 114 and the head 96 is established. Thereafter, continued actuating movement of the control member 56c will be opposed by the body 114 by an amount which will be generally proportion to the output force being delivered by the fluid displacement member D. By this expediency, therefore, the operator will be apprised of the intensity of the force being delivered by the servomotor, and hence the intensity of the braking application being produced. When the desired intensity has been reached, further forward movement of the pushrod F is stopped; whereupon the power piston C moves forwardly just sufficient to bring the vacuum valve seat 52c into engagement with the flange 48c and thereafter prevent further air flow out of the power chamber of the servomotor.

When a release of the servomotor unit is desired, rearward movement of the pushrod F permits the atmospheric valve seat 58c to move out of engagement with the flange 48c and thereby communicate air to the power chamber 38c to reduce the differential pressure across the power piston C. Hydraulic pressure within the chamber 12 in conjunction with the force exerted by the return spring 76c causes the fluid displacement member D to be moved rearwardly. The elastomeric body 114 stays into engagement with the head of the pin 96c during retractile movement of the power piston up until such time as the previously referred to generally predetermined level of output pressure is reached (which in the present instance corresponds to the hydraulic pressure in chamber 12 at which the brake shoes just engage their brake drum). When the output level of force decreases below said generally predetermined level, the resiliency of the elastomeric body causes the material to begin to move back into the chamber 82c and thereby separate from the head 96c of the reaction pin 98c. Thereafter, further reaction force will no longer be delivered by the elastomeric compound against the control member 56c, and only such force as is required to operate the valve and its return springs 80c and 54c need be exerted by the operator.

It will be apparent to those skilled in the art that the pressure deformable body 86 used in the embodiment shown in FIGURE 1 need not of itself have sufficient resiliency to cause the body to return into the chamber 82, inasmuch as the counter-reaction spring 94 used in that embodiment will substantially perform this function. The body 86 as used in the embodiment shown in FIGURE 1 should, however, have sufficient body so as to permit it to be formed to contain a generally predetermined volume of material, and to permit it to be readily picked up and installed into the chamber 82 by an assembler during the manufacture of the unit. In the embodiment shown in FIGURE 4 of the drawings, the pressure deformable body should have sufficient resilience so as to require that a generally predetermined deformation pressure will be required to be developed therein before it will be deformed by a generally predetermined amount. In the practice of the invention as shown in FIGURE 4, applicant has found that fluorinated silicone elastomers give superior results which include substantially no hysteresis loss even when a lubricant is not used. This material is currently quite expensive and applicant has found that entirely satisfactory results can be achieved without the use of an additional lubricant where an internally lubricated elastomer is used, as for example a Buna N type stock having microscopic particles of oil dispersed throughout the mass.

It will be apparent that the objects heretofore enumerated as well as others have been achieved and that there has been provided a servomotor construction which is greatly simplified and which can be assembled with a minimum of time and effort. While the invention has been described in considerable detail, I do not wish to be limited to the particular constructions shown and described; and it is my intention to cover hereby all novel adaptations, modifications and arrangements thereof which come within the practice of those skilled in the art to which the invention relates and which come within the purview of the following claims.

I claim:

1. For use with a servomotor mechanism having a power device, means controlling said power device, force transmitting means operatively connected to said power device, said force transmitting means including a confined flowable medium arranged for pressurization upon actuation of said power device, and reaction means operatively connected to said controlling means and to said force transmitting means to sense a proportionate amount of the pressurization of said flowable medium.

2. In a fluid motor mechanism having a body, a power actuated member in said body, a driven member drivably connected to said power actuated member, a solid medium having predetermined flow characteristics under pressure confined between said members in such a way as to flow upon actuation of said power actuated member in response to a driving force applied to said driven member, a control member operatively connected to said medium to sense the driving force, said control member causing said power actuated member to drive said driven member when moved toward said solid medium, and said control member being operatively connected to said medium to sense the driving force of said driven member.

3. In reaction means for a servomotor and the like: a power actuated member; a driven member; one of said power actuated and driven members having a chamber therein into which the other slidably projects; a semi-rigid body in said chamber for abutment by said other one of said power actuated and driven members; one of said power actuated and driven members having an opening communicating with said chamber; control means for controlling operation of said power actuated member, said control means having a portion projecting into said opening for operative abutment by said semi-rigid body; said semi-rigid body being deformable and being of a nature which distributes pressure forces in substantially all directions in such manner that a deformation pressure is produced in said semi-rigid body that is generally proportional to the force being delivered to said driven member, and said deformation pressure being delivered against said portion of said control means to provide a reactive force whose intensity is a function of the size of said portion of said control means and the intensity of said deformation pressure.

4. In reaction means for a servomotor: a power actuated member; a driven member; one of said power actuated and driven members having a chamber therein into which the other slidably projects; a semi-rigid body in said chamber for abutment by said other one of said power actuated and driven members; one of said power actuated and driven members having an opening communicating with said chamber; manually actuatable control means for controlling operation of said power actuated member, said control means having a portion projecting into said opening for abutment with said semi-rigid body; said semi-rigid body being deformable and being of a nature which distributes pressure forces in substantially all directions in such manner that a deformation pressure is produced in said semi-rigid body that is generally proportional to the force being delivered to said driven member, and said deformation pressure being delivered against said portion of said manually actuatable means to provide a reactive force whose intensity is a function of the size of said portion of said manually actuatable control means and the intensity of said deformation pressure, said semi-rigid body also having the property of substantially returning to its original shape when the pressure deformation forces are removed therefrom.

5. In reaction means for a servomotor: a power actuated member; a driven member; one of said power actuated and driven members having a chamber therein into which the other slidably projects; a semi-rigid body of rubber-like material in said chamber for abutment by said other one of said power actuated and driven members; one of said power actuated and driven members having an opening communicating with said chamber; control means for said servomotor which when actuated causes said power actuated and driven members to be forced together tending to decrease the volume of said chamber, said control means having a portion projecting into said opening for abutment with said semi-rigid body and being constructed and arranged to oppose actuating movement of said control member when said portion is forced outwardly of said chamber; said semi-rigid body being deformable and being of a nature which distributes pressure forces in substantially all directions in such manner that a deformation pressure is produced in said semi-rigid body that is generally proportional to the force being delivered to said driven member, and said deformation pressure being delivered against said portion of said control means to provide a reactive force whose intensity is a function of the size of said portion of said control means and the intensity of said deformation pressure, said semi-rigid body of rubber-like material also having the property of substantially returning to its original shape when the pressure deformation forces are removed therefrom.

6. In reaction means for a servomotor: a power actuated member; a driven member; one of said power actuated and driven members having a chamber therein into which the other slidably projects; a semi-rigid body of rubber-like material in said chamber for abutment by said other one of said power actuated and driven members, said body being slightly larger in cross section than is said chamber to provide a snug fit with respect thereto; one of said power actuated and driven members having an opening communicating with said chamber; control means for said servomotor which when actuated causes said power actuated and driven members to be forced together tending to decrease the volume of said chamber, said control means having a portion projecting into said opening for abutment with said semi-rigid body and being constructed and arranged to oppose actuating movement of said control member when said portion is forced outwardly of said chamber; said semi-rigid body being deformable and being of a nature which distributes pressure forces in substantially all directions in such manner that a deformation pressure is produced in said semi-rigid body that is generally proportional to the force being delivered to said driven member, and said deformation pressure being delivered against said manually actuatable member to provide a reactive force whose intensity is a function of the size of said portion of said manually actuatable member and the intensity of said deformation pressure.

7. In reaction means for a servomotor: a power actuated member; a driven member; one of said power actuated and driven members having a chamber therein into which the other slidably projects; a liquid filled pliable bag in said chamber for abutment by said other one of said power operated and driven members; one of said power actuated and driven members having an opening communicating with said chamber; and a manually actuatable member having a portion projecting into said opening for abutment with said liquid filled bag, which distributes pressure forces in substantially all directions in such manner that a deformation pressure is produced in said bag that is generally proportional to the force being delivered to said driven member, and said deformation pressure being delivered against said manually actuatable member to provide a reactive force whose intensity is a function of the size of said portion of said manually actuatable member and the intensity of said deformation pressure.

8. In reaction means for a servomotor: a power actuated member; a driven member; one of said power actuated and driven members having a chamber therein into which the other slidably projects; a liquid filled bellows in said chamber for abutment by said other one of said power operated and driven members; one of said power actuated and driven members having an opening communicating with said chamber; and a manually actuatable member having a portion projecting into said opening for abutment with said liquid filled bellows, said bellows having a corrugation of approximately the size of said opening positioned over said opening in a manner permitting the portion of said bellows within said corrugation to be forced against said portion of said manually actuatable member.

9. In reaction means for a servomotor: a power actuated member; a driven member; one of said power actuated and driven members having a chamber therein into which the other slidably projects; a semi-rigid body of an elastomeric compound in said chamber for abutment by said other one of said power operated and driven members; one of said power actuated and driven members having an opening communicating with said chamber; a manually actuatable member having a portion projecting into said opening for abutment with said semi-rigid body; said semi-rigid body being a fluorinated silicone polymer.

10. In reaction means for a servomotor: a power actuated member; a driven member; one of said power actuated and driven members having a chamber therein into which the other slidably projects; a semi-rigid body of an elastomeric compound in said chamber for abutment by said other one of said power operated and driven members; one of said power actuated and driven members having an opening communicating with said chamber; a manually actuatable member having a portion projecting into said opening for abutment with said semi-rigid body; said semi-rigid body being an oil filled elastomeric stock wherein microscopic particles of oil are substantially uniformly dispersed throughout the elastomeric mass.

11. A servomotor comprising: a body member having a longitudinally extending axis therein, a power actuated member in said body member movable forwardly and rearwardly along said axis; an axially positioned driven member extending forwardly of said power actuated member; axially positioned manually movable control means extending rearwardly of said power actuated member and constructed and arranged to cause said power actuated member to be power actuated forwardly when said control means is moved forwardly from a predetermined position; one of said power actuated and driven members having an axially extending chamber therein for receiving one end of the other of said power actuated and driven members; said power actuated member having a smaller axially extending opening between said control member and said chamber; a semi-rigid body of rubber-like material in said chamber for abutment by said driven member; said control means having a portion in said opening rearwardly of said enlarged portion of said opening for abutment by said semi-rigid body and there being a generally predetermined amount of lost motion provided by said portion of said control means when said control means is in its predetermined position; said semi-rigid body being deformable and being of a nature which distributes pressure forces in substantially all directions in such manner that a deformation pressure is produced in said semi-rigid body that is generally proportional to the force being delivered to said driven member, and said deformation pressure being delievered against said portion of said control means after a generally predetermined output force is applied to said driven member to provide a reactive force whose intensity is generally a function of the size of said portion of said control member and the intensity of said deformation pressure.

12. A servomotor comprising: a body member having a longitudinally extending axis therein, a power actuated member is said body member movable forwardly and rearwardly along said axis; an axially positioned driven member extending forwardly of said power actuated member; an axially positioned manually movable control means extending rearwardly of said power actuated member and constructed and arranged to cause said power actuated member to be power actuated forwardly when said control means is moved forwardly from a predetermined position; one of said power actuated and driven members having an axially extending chamber therein for receiving one end of the other of said power actuated and driven members; said power actuated member having a smaller axially extending opening between said control member and said chamber; a semi-rigid body of rubber-like material in said chamber for abutment by said driven member; said semi-rigid body having a normal cross sectional area which is slightly larger than that of said chamber to provide a snug fit therewith; said control means having a portion in said open rearwardly of said chamber for abutment by said semi-rigid body and there being a generally predetermined clearance between said portion and said semi-rigid body when said control means is in its predetermined position; said semi-rigid body being deformable and being of a nature which distributes pressure forces in substantially all directions in such manner that a deformation pressure is produced in said semi-rigid body that is generally proportional to the force being delivered to said driven member, and said deformation pressure being delivered against said portion of said control member after a generally predetermined output force is applied to said driven member to provide a reactive force whose intensity is generally a function of the size of said portion of said control member and the intensity of said deformation pressure.

13. A servomotor comprising: a body member having a longitudinally extending axis therein, a power actuated member in said body member movable forwardly and rearwardly along said axis; an axially positioned driven member extending forwardly of said power actuated member; axially positioned manually movable control means extending rearwardly of said power actuated member and constructed and arranged to cause said power actuated member to be power actuated forwardly when said control means is moved forwardly from a predetermined position; one of said power actuated and driven members having an axially extending chamber therein for receiving one end of the other of said power actuated and driven members; said power actuated member having a smaller axially extending opening between said control member and said chamber; a semi-rigid body of rubber-like material having a lubricant impregnated therein positioned in said chamber for abutment by said driven member; said semi-rigid body having a normal cross sectional area which is slightly larger than that of said chamber to provide a snug fit therewith; said control means having a portion in said opening rearwardly of said chamber for abutment by said semi-rigid body and there being a generally predetermined clearance between said portion and said semi-rigid body when said control means is in its predetermined position; said semi-rigid body being deformable and being of a nature which distributes pressure forces in substantially all directions in such manner that a deformation pressure is produced in said semi-rigid body that is generally proportional to the force being delivered to said driven member, and said deformation pressure being delievered against said portion of said control member after a generally predetermined output force is applied to said driven member to provide a reactive force whose intensity is generally a function of the size of said portion of said control member and the intensity of said deformation pressure.

14. A fluid pressure servomotor comprising: a body member having a longitudinally extending axis therein, a fluid pressure actuated member in said body member movable forwardly and rearwardly along said axis; an axially positioned driven member extending forwardly of said fluid pressure actuated member; a control valve having axially positioned manually movable control means extending rearwardly of said power actuated member and constructed and arranged to cause said fluid pressure actuated member to be power actuated forwardly when said control means is moved forwardly from its position corresponding to the lapped condition of said control valve; said power actuated member having an axially extending opening therethrough which is enlarged adjacent its front end to telescopically receive one end of said driven member; a semi-rigid body of rubber-like material in said enlarged portion of said opening for abutment by said driven member; a reaction member in said opening rearwardly of said enlarged portion of said opening for transferring abutting forces of said semi-rigid body to said control member, and there being a generally predetermined amount of lost motion provided by said reaction member when said control valve is in its lapped position; said semi-rigid body being deformable and being of a nature which distributes pressure forces in substantially all directions in such manner that a deformation pressure is produced in said semi-rigid body that is generally proportional to the force being delivered to said driven member, and said deformation pressure being delivered against said reaction member after a generally predetermined output force is applied to said driven member to provide a reactive force whose intensity is generally a function of the size of said reaction member and the intensity of said deformation pressure.

15. A fluid pressure servomotor comprising: a body member having a longitudinally extending axis therein, a fluid pressure actuated member in said body member movable forwardly and rearwardly along said axis; an axially positioned driven member extending forwardly of said fluid pressure actuated member; a control valve having an axially positioned manually movable control member extending rearwardly of said power actuated member and constructed and arranged to cause said power actuated member to be power actuated forwardly when said control member is moved forwardly from its position corresponding to the lapped condition of said control valve; said power actuated member having an axially extending opening therethrough which is enlarged adjacent its front end to telescopically receive one end of said driven member, said enlarged portion of said opening having a radially extending shoulder at its inner end; a semi-rigid body of an elastomeric compound in said enlarged portion of said opening for abutment by said driven member; said control member having a portion in said opening rearwardly of said enlarged portion of said opening for abutment by said semi-rigid body; an annular shim positioned between said semi-rigid body and said shoulder for providing a generally predetermined amount of clearance between said portion of said control member in said opening and said semi-rigid body; said semi-rigid body being deformable and being of a nature which distributes pressure forces in substantially all directions in such manner that a deformation pressure is produced in said semi-rigid body that is generally proportional to the force being delivered to said driven member, and said deformation pressure being delivered against said manually actuatable member to provide a reactive force whose intensity is a function of the size of said portion of said manually actuatable member and the intensity of said deformation pressure.

16. A force applying mechanism, comprising, a fluid pressure operated motor having a pressure responsive unit therein, a force applying member operably connected with said pressure responsive unit effective for transmission of force from said pressure responsive unit and arranged to receive reaction force in proportion to the force exerted by the pressure responsive unit, an operator-operated control member, follow-up control valve mechanism actuated by the control member having a normal off position balancing pressures in said motor and being movable from said off position by actuation of said control member to establish differential pressures in said motor to move said pressure responsive unit thereby; and a coherent generally solid elastically deformable force transmitting mass of predetermined volume confined in a space of substantially the same volume as defined by said force transmitting member, said pressure responsive unit and said control member in engagement therewith to transmit thereby motive power from said pressure responsive unit to said force applying member and to transmit thereby reaction forces from said force applying member to said pressure responsive unit and to said control member, the area of engagement of the force applying member with the said mass being greater than the area of engagement of the said control member with the said mass to proportion thereby the proportion of reaction effect transmitted to said control member.

17. A force applying mechanism, comprising, a fluid pressure operated motor having a casing and a pressure responsive unit therein, a force transmitting member operably connected with said pressure responsive unit, a manually operable operator-operated member, follow-up control valve mechanism having a normal off position balancing pressures in said motor and being movable from said off position by actuation of said manually operable member to establish differential pressures in said motor to move said pressure responsive unit; said pressure responsive unit having a recess therein receiving a portion of said force transmitting member and a portion of said manually operable member and defining thereby a closed cavity of predetermined volume when the force applying mechanism is in inactive position, and a deformable force transmitting body substantially filling the so defined cavity except for a predetermined cavity volume not filled by said members and displaceable by pressure applied to said body by relative movement between said force transmitting member and said pressure responsive unit to first fill said predetermined cavity volume by displaced body and then to apply pressure by the displaced body on said manually operable member in a predetermined ratio to the pressure applied to the body by the relative movement between said pressure responsive unit and said power transmitting member.

18. A brake booster mechanism, comprising, a fluid pressure operated motor having a casing and a pressure responsive unit therein, a power transmitting member operably connected with said pressure responsive unit effective for transmission of force from said pressure responsive unit and to receive reaction force, a manually operable member including a follow-up control valve mechanism having a normal "off" position balancing pressures in said motor and being movable from said "off" position by actuation of said manually operable member to establish differential pressures in said motor to actuate said pressure responsive means; and a deformable force transmitting liquid body between said power transmitting member and said manually operable member to transmit pressure reaction forces to said manually operable member in a predetermined proportion of the total reaction force acting on said power transmitting member, said liquid body having a predetermined volume in the relaxed state of the body that is less than the displaceable volume of the space for the body whereby to provide for delay of transmission of initial reaction force to said manual member.

19. A brake booster mechanism, comprising, a fluid pressure operated motor having a casing and a pressure responsive unit therein, a power transmitting member operably connected with said pressure responsive unit effective for transmission of force from said pressure responsive unit and to receive reaction force, a manually operable member including a follow-up control valve mechanism having a normal "off" position balancing pressures in said motor and being movable from said "off" position by actuation of said manually operable member to establish differential pressures in said motor to actuate said pressure responsive means; and a non-resilient deformable plastic body having substantially no elastic recovery in a state of total confinement between said power transmitting member and said manually operable member to transmit pressure reaction forces to said manually operable member in a predetermined proportion of the total reaction force acting on said power transmitting member on relative movement between said power transmitting member and said pressure responsive means with resultant deformation of said plastic body and transmission of force thereby to said manually operable member and said pressure responsive means.

20. A booster motor mechanism comprising a fluid pressure motor having a pressure responsive unit, a unit to be operated arranged coaxial with said pressure responsive unit, a valve mechanism connected between said motor and sources of different pressures and normally connecting said motor to one of said sources to balance pressures on opposite sides of said pressure responsive unit, said valve mechanism being movable to disconnect said one source from said motor and connect the other source thereto to operate said pressure responsive unit, said valve mechanism comprising a plurality of elements one of which is manually operable, an elastic body confined between said units and said manually operable element and engaging one of said units with respect to which body both said manually operable element and the other of said units are relatively movable from normal off positions, and reaction members engaging respectively with said manually operable element and with said pressure responsive unit and having concentric surfaces engaging said elastic body whereby, upon operation of said valve mechanism and energization of said motor, both of said surfaces will deliver forces to said elastic body and through such body to said unit to be operated.

21. A booster motor mechanism comprising a fluid pressure motor having a pressure responsive unit, a member to be operated arranged coaxial with said pressure responsive unit, a valve mechanism connected between said motor and source of different pressures and normally connecting said motor to one of said sources to balance pressures on opposite sides of said pressure responsive unit, said valve mechanism being movable to disconnect said one source from said motor and connect the other source thereto to operate said pressure responsive unit, said valve mechanism comprising a plurality of elements one of which is manually operable, force transmitting structure for said member to be operated to transmit operating forces thereto, said pressure responsive unit and said manually operable element being movable from normal off positions relative to each other, said force transmitting structure forming a surface of a groove, an elastic body in said groove, and reaction members engaging respectively with said manually operable element and with said pressure responsive unit and having concentric surfaces engaging said elastic body whereby, upon operation of said valve mechanism and energization of said motor, both of said surfaces will deliver forces to said elastic body and through said force transmitting structure to said member to be operated.

22. A booster motor mechanism comprising a fluid pressure motor having a pressure responsive unit including an axial body, a member to be operated arranged coaxial with said pressure responsive unit, a valve mechanism connected between said motor and sources of different pressures and normally connecting said motor to one of said sources to balance pressures on opposite sides of said pressure responsive unit, said valve mechanism being movable to disconnect said one source from said motor and connect the other source thereto to operate said pressure responsive unit, said valve mechanism comprising a plurality of elements one of which is coaxial with said member to be operated and is manually operable, said body having a space therein, an elastic body in said space having force transmitting connection with said member to be operated and with respect to which body both said manually operable element and said pressure responsive unit are respectively movable from normal off positions, and reaction members in said space engaging respectively with said manually operable element and with said pressure responsive unit and having concentric surfaces engaging said elastic body whereby, upon operation of said valve mechanism and energization of said motor, both of said surfaces will deliver forces to said elastic body and through such body to said member to be operated, said elastic body being confined radially and in the direction of movement of said member to be operated and having one exposed face engageable with said reaction members.

23. A booster motor mechanism comprising a fluid pressure motor having a pressure responsive unit including an axial body, a member to be operated arranged coaxial with said pressure responsive unit, a valve mechanism connected between said motor and sources of different pressures and normally connecting said motor to one of said sources to balance pressures on opposite sides of said pressure responsive unit, said valve mechanism being movable to disconnect said one source from said motor and connect the other source thereto to operate said pressure responsive unit, said valve mechanism comprising a plurality of elements one of which is coaxial with said member to be operated and is manually operable, force transmitting structure surrounding the axis of said pressure responsive unit, said structure including a groove, an elastic body fitting in said groove and having an exposed face, reaction means carried respectively by said body of said pressure responsive unit and by said manually operable member and having surfaces engaging said elastic body, and means biasing said pressure responsive unit to a normal off position, said pressure responsive unit being movable from such position independently of said force transmitting structure.

24. A mechanism according to claim 23 wherein said reaction members and said surfaces thereof are concentric with said elastic body.

25. A booster brake mechanism comprising a fluid pressure motor having a pressure responsive unit including a cast body, said body in one side thereof having an axial cavity opening through said body in the direction of movement of said pressure responsive unit when said motor is energized, a valve mechanism in said cavity normally connecting said motor to one source of pressure and being movable from normal off position to connect said motor to a different source of pressure to move said pressure responsive unit, said valve mechanism comprising a plurality of elements one of which is coaxial with said motor and is manually operable, a member to be operated arranged coaxial with said manually operable element, force transmitting structure including said member to be operated and having a groove, an elastic body substantially filling said groove and having an exposed surface facing away from the direction of movement of said member to be operated from said normal off position, and reaction members in said cavity engaging respectively with said cast body and with said manually operable member and having surfaces engaging said exposed surface of said elastic body whereby, upon operation of said valve mechanism and energization of said motor, said surfaces of said reaction members will transmit forces to said elastic body and through said force transmitting member to said member to be operated.

26. A mechanism according to claim 25 wherein said cavity is provided with a wall portion against which one of said reaction members seats to transmit force from said cast body to said elastic body, said manually operable element having a shoulder engaging the other of said reaction members to transmit force from such element to said elastic body.

27. In a fluid motor mechanism having a body, a power actuated member in said body, a driven member drivably connected to said power actuated member, said members being so constructed and arranged that together they provide a chamber the volume of which changes when said power member is actuated, a medium substantially filling said chamber, and a control member movable in a direction to cause said power actuated member to drive said driven member, said control member being operatively connected to said medium to sense the driving force of said driven member.

28. In a fluid motor mechanism having a body, a power actuated member in said body, a driven member drivably connected to said power actuated member, a medium confined within and substantially filling a space formed between said members for transmitting force from said power actuated member to said driven member, and a control member movable in a direction to cause said power actuated member to drive said driven member, said control member being operatively connected to said medium to sense the driving force of said driven member.

29. In a fluid motor mechanism having a body, a power actuated member in said body, a driven member drivably connected to said power actuated member, a confined medium within and substantially filling a collapsible chamber through which the driving force of said power actuated member is transmitted to said driven member, and a control member movable in a direction to cause said power actuated member to drive said driven member, said control member being operatively connected to said medium to sense the internal pressure of said confined medium.

30. In structure for providing reaction force generally proportional to a delivered force: a body member; axially aligned power actuated and driven members in said body member; one of said power actuated and driven members having an axially extending chamber into which chamber the other of said members slidingly sealingly projects, a body of pressurizable material isolated in said chamber when said power actuated member is moved toward said driven member, said driven member being actuated by the pressure forces generated in said chamber when said power actuated member moves toward said driven member, and a pin at least one end of which is slidingly received in one of said members and the end of which member is subjected to the pressure generated in said chamber and by which a reactive force is developed which is indicative of the force being transmitted to said driven member by said power actuated member.

31. For use in a servomotor having a power actuated member and a driven member adapted to be moved by said power actuated member, means for providing an indication to the operator of the amount of force being exerted by the servomotor comprising a flowable force-transmitting means interposed between said members to be internally pressurized during their power stroke, and a reaction member acted on by the internal pressure of only a portion of said last named means and urged thereby against the control force exerted by the operator.

32. In structure for providing reactive force generally proportional to a delivered force: a driven member, a driving member which when actuated moves toward said driven member, a body of pressurizable material confined between said members, said body developing a pressure therein when said driving member moves toward said driven member which pressure is exerted against said driven member to drive said driven member, a control member which when moved in a given direction causes said driving member to move toward said driven member, and reaction means subjected to the internal pressure generated in said body of pressurizable material and which means transmits a force to said control member opposing its actuating movement.

33. A force applying mechanism, comprising a fluid pressure operated motor having a casing and a pressure responsive unit therein, a force transmitting member operably connected with said pressure responsive unit, a manually operable operator-operated member, follow-up control valve mechanism having a normal off position balancing pressures in said motor and being movable from said off position by actuation of said manually operable member to establish differential pressures in said motor to move said pressure responsive unit; said pressure responsive unit having a recess therein receiving a portion of said force transmitting member and a portion of said manually operable member and defining thereby a closed cavity of predetermined volume when the force applying mechanism is in inactive position, and a deformable force transmitting body substantially filling the so defined cavity and displaceable by pressure applied to said body by relative movement between said force transmitting member and said pressure responsive unit to apply pressure by the displaced body on said manually operable member in a controlled ratio to the pressure applied to the body by the relative movement between said pressure responsive unit and said force transmitting member.

References Cited in the file of this patent

UNITED STATES PATENTS

| | | |
|---|---|---|
| 1,994,388 | Erichsen | Mar. 12, 1935 |
| 2,275,697 | Stelzer | Mar. 10, 1942 |
| 2,318,437 | Vickers | May 4, 1943 |
| 2,577,852 | Hufferd | Dec. 11, 1951 |
| 2,646,665 | Rockwell | July 28, 1953 |
| 2,735,268 | Stelzer | Feb. 21, 1956 |
| 2,754,806 | Funston | July 17, 1956 |
| 2,811,836 | Ayers | Nov. 5, 1957 |
| 2,826,042 | Rike et al. | Mar. 11, 1958 |
| 2,861,427 | Whitten | Nov. 25, 1958 |
| 2,862,365 | Ingres et al. | Dec. 2, 1958 |